US005473353A

United States Patent [19]

Soucemarianadin et al.

[11] Patent Number: 5,473,353

[45] Date of Patent: Dec. 5, 1995

[54] MULTIJET PRINTING MODULE AND PRINTING MACHINE INCLUDING SEVERAL MODULES

[75] Inventors: Arthur Soucemarianadin, Peray; Thierry Colombat, La Voulte, both of France

[73] Assignee: Imaje S.A., Bourg les Valence, France

[21] Appl. No.: 938,720

[22] Filed: Sep. 1, 1992

[30] Foreign Application Priority Data

Sep. 10, 1991 [FR] France ........ 91 11151

[51] Int. Cl.[6] ........ G01D 15/18

[52] U.S. Cl. ........ 347/74; 347/42

[58] Field of Search ........ 347/40, 49, 42, 347/74–81, 89, 90

[56] References Cited

U.S. PATENT DOCUMENTS

| | | | |
|---|---|---|---|
| 4,160,982 | 7/1979 | Keur | 347/90 X |
| 4,305,079 | 12/1981 | Mix, Jr. | 347/90 X |
| 4,321,608 | 3/1982 | Kakeno | 347/77 |
| 4,709,247 | 11/1987 | Piatt et al. | 347/40 |
| 4,755,836 | 7/1988 | Ta et al. | 347/49 |
| 5,241,325 | 8/1993 | Nguyen | 347/49 |

FOREIGN PATENT DOCUMENTS

| | | | |
|---|---|---|---|
| 2535652 | 5/1984 | France . | |
| 2576251 | 7/1986 | France . | |
| 2653063 | 4/1991 | France . | |
| 61-121951 | 6/1986 | Japan . | |
| 4-133742 | 5/1992 | Japan | 347/49 |
| 5-096719 | 4/1993 | Japan | 347/49 |

*Primary Examiner*—A. T. Grimley
*Assistant Examiner*—Shuk Y. Lee
*Attorney, Agent, or Firm*—Roland Plottel

[57] ABSTRACT

An ink-jet printing machine which has adjacent printing modules. In each printing module, the ink-jet generating device, the ink-drop deflecting device and the collector for collecting the undeflected drops are borne by a single-piece element located on one face of a supporting beam. The opposite face of the supporting beam bears an ink feeding device, and a container to collect the unused ink coming from the collector and the generation device. The deflecting device is mounted in a pivoting manner so that it can be interposed between the generating device and the collector during the printing operation, and can be withdrawn during the maintenance operation.

16 Claims, 10 Drawing Sheets

MULTIJET PRINTING MODULE AND PRINTING MACHINE INCLUDING SEVERAL MODULES

BACKGROUND OF THE INVENTION

1. Field of the Invention

The invention relates to deflected continuous ink-jet printing machines and, more particularly in such machines, it relates to a printing head or module that gives several simultaneous jets and allows an assembly of several adjacent printing modules having a constant pitch between jets in order to obtain a wide-format printing machine.

2. Description of the Prior Art

Deflected continuous ink jet printing heads are known, and one of them has been described in the co-pending U.S. patent application No. 07/687,925 entitled "Ink Jet Printing Head" corresponding to the published PCT application no. WO 91/05663. In the above-mentioned patent application, the head comprises the following in a single pack: at least two modulation elements comprising injection nozzles fed by a single ink circuit and a module for the recovery of unused drops, common to all the jets, with only one recovery outlet. The single pack has a base used as a support for the modulation elements, charge electrodes, phase detection or speed detection electrodes, and deflection electrodes, these different elements having to be aligned with a precision of the order of one-hundredth of a millimeter.

Such precision is very difficult to obtain when these elements are manufactured separately and then mounted on the base, and the greater the number of ink jets of the printing head, the more difficult it is to obtain this precision. Moreover, the number of adjustments to be made, notably adjustments of alignment, during the mounting and maintenance is high.

Besides, it can be seen that a printing head of this type is ill-suited for the design of a row of several tens of ink jets as the cost of manufacturing and maintaining such a system would be very high.

SUMMARY OF THE INVENTION

An object of the present invention is therefore to embody a multijet printing module or head, the manufacture of which is considerably simplified while, at the same time, there is high precision of positioning of the different elements.

Another object of the present invention is to embody a multijet printing module that can be associated with one or more modules of the same type, so as to make a machine for wide-format printing and provide for the adjustment of tracks among the different modules.

The invention therefore relates to a multijet printing module with m parallel ink jets comprising:

first means for generating m parallel ink jets arranged in a plane, second means for deflecting at least certain drops of ink coming from said ink jets towards a medium to be printed on, third means for collecting the undeflected drops, fourth means for feeding said first means with ink, fifth means for transferring the ink recovered by the third means to a container, sixth means for draining said first means in said container, wherein:

the first, second and third means are borne by an element consisting of a single piece, the second means are mounted in a pivoting manner so that they can be interposed between the first and third means during the printing on said medium to be printed on and can get withdrawn therefrom to enable the maintenance of the first, second and third means.

According to the invention, the single-piece element is borne by one face of a supporting beam, the other face of which bears the fourth, fifth and sixth means.

The different means, except for the second means, communicate with one another by passages inside the single-piece element and the supporting beam.

The invention also relates to a wide-format printing machine that comprises a plurality of adjacent printing modules which are juxtaposed on the support beam so as to maintain the same pitch between jets.

BRIEF DESCRIPTION OF THE DRAWINGS

Other objects, features and advantages of the present invention shall appear from the following example of a particular exemplary embodiment, said description being made with reference to the appended drawings, of which.

Figure 4:
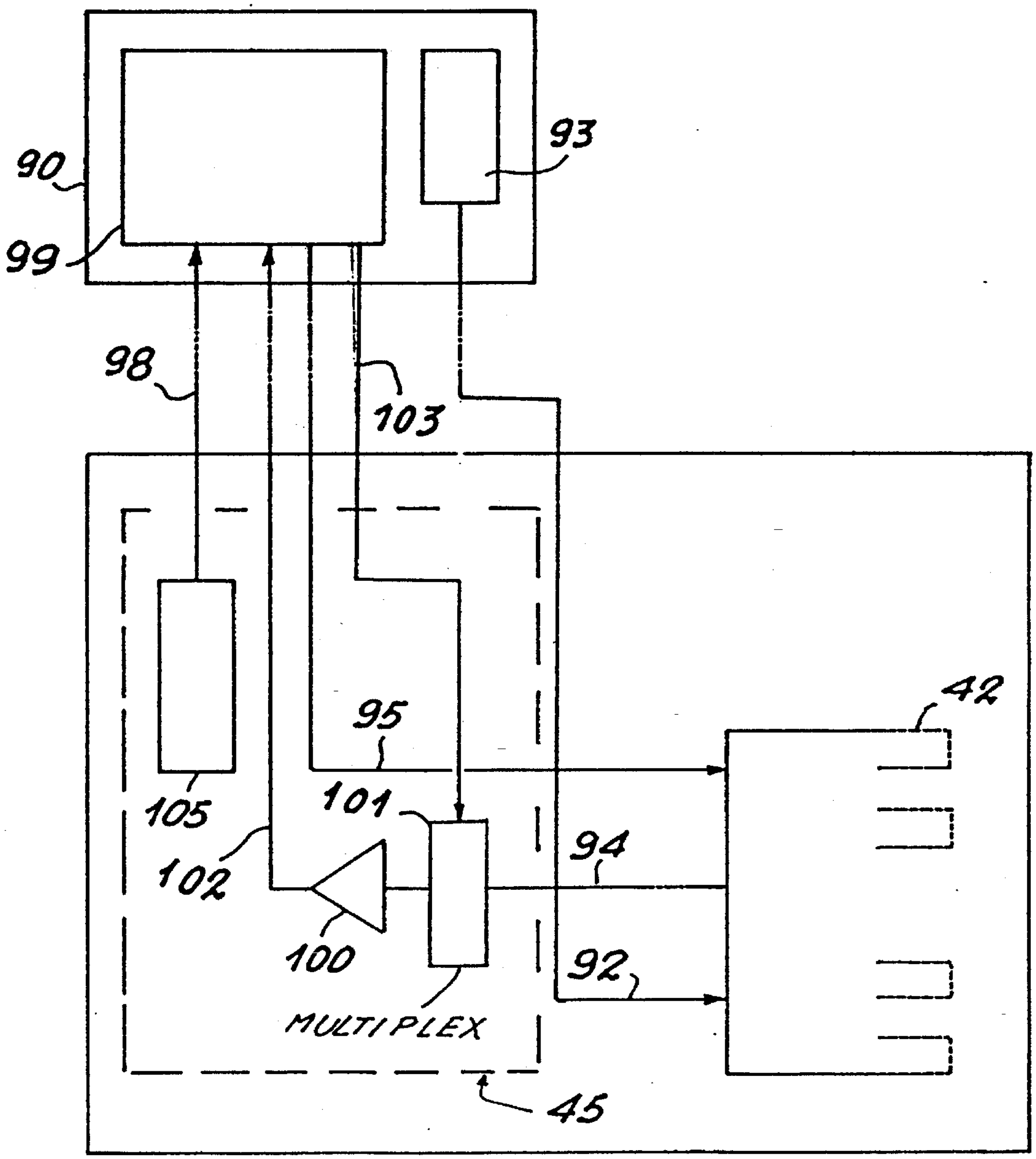
Figure 6A:
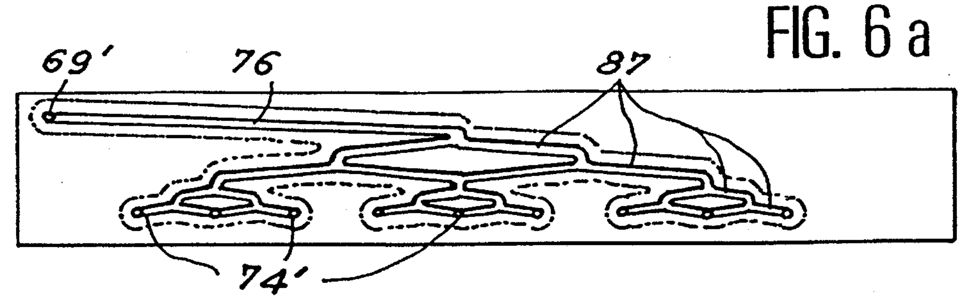
Figure 6B:
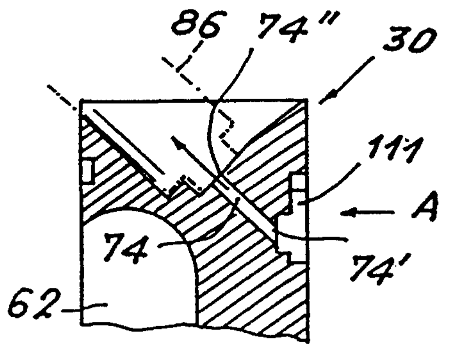
Figure 6D:
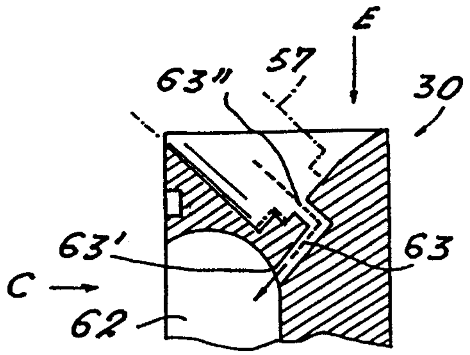
Figure 7:
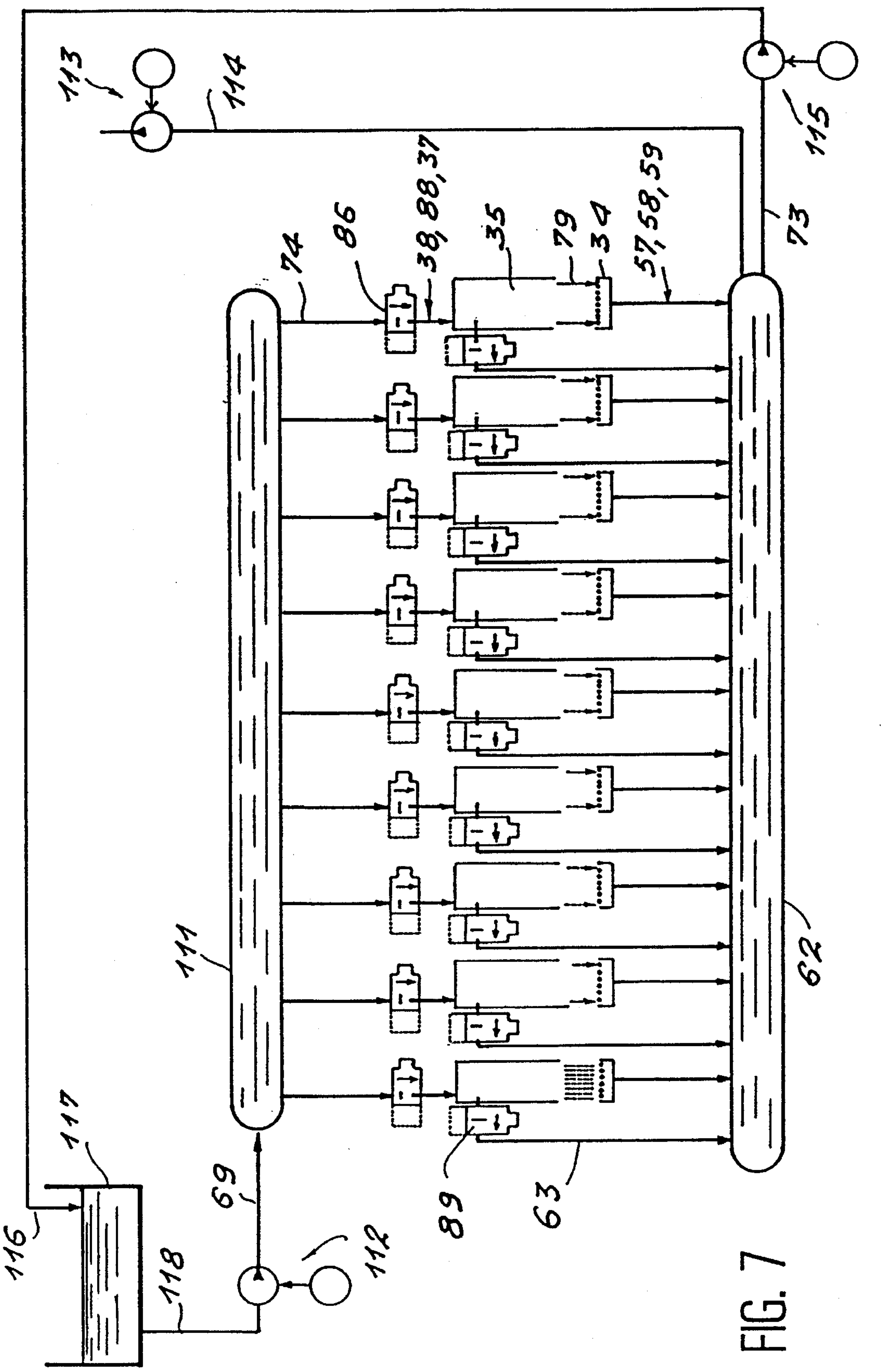
Figure 8:
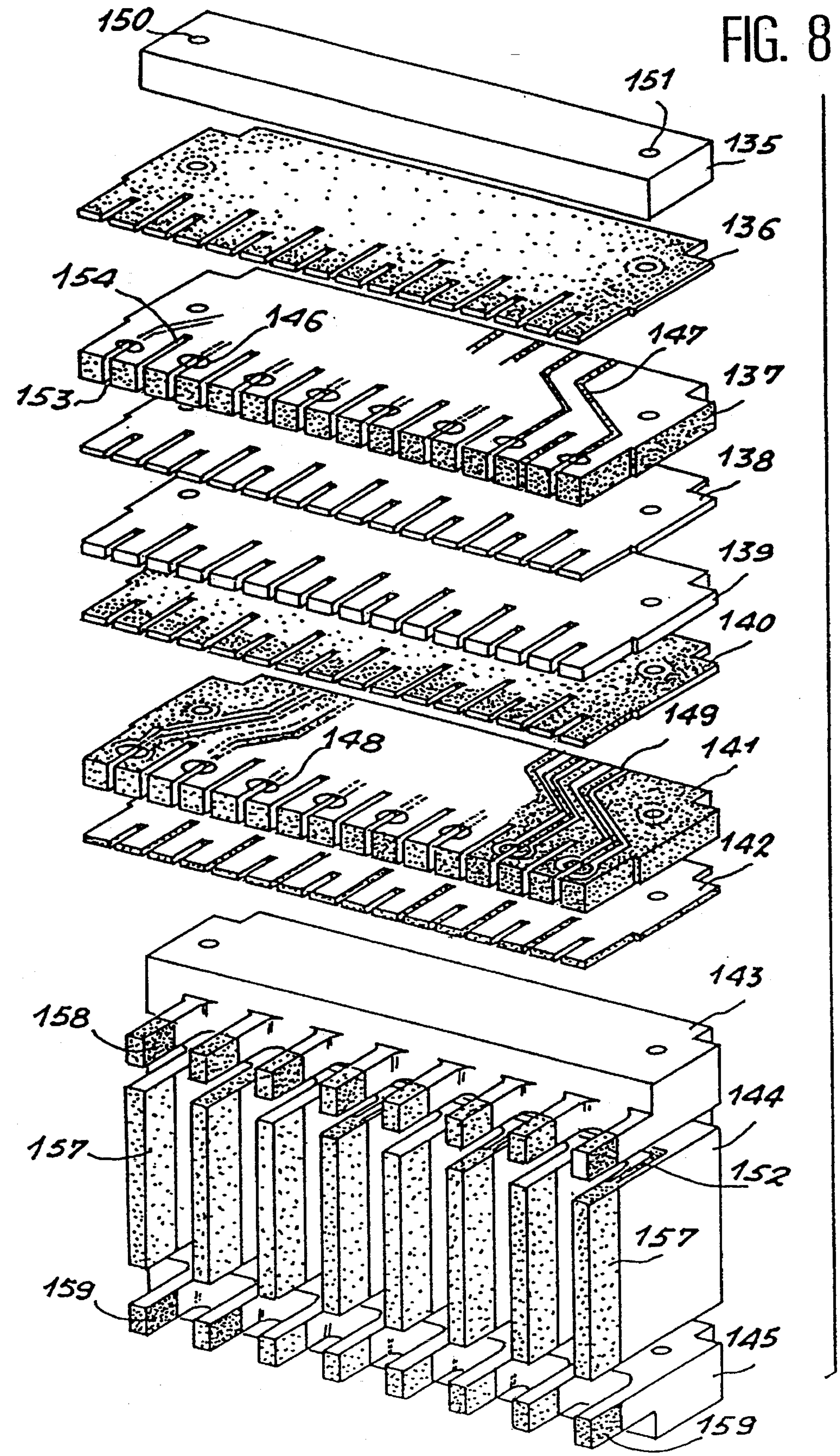
Figure 9:
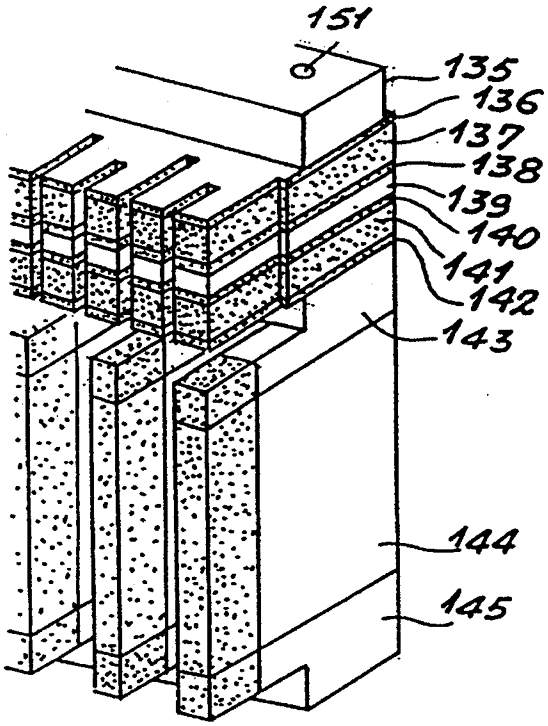
Figure 12:
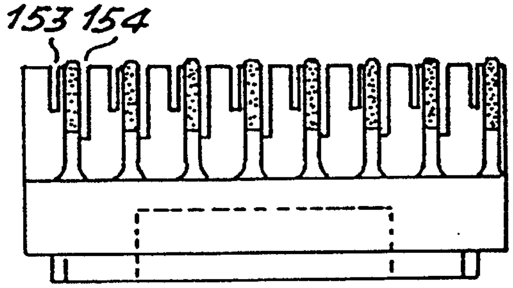
Figure 11:
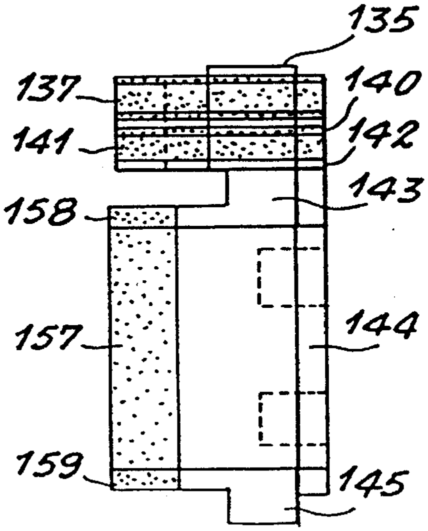
Figure 10:
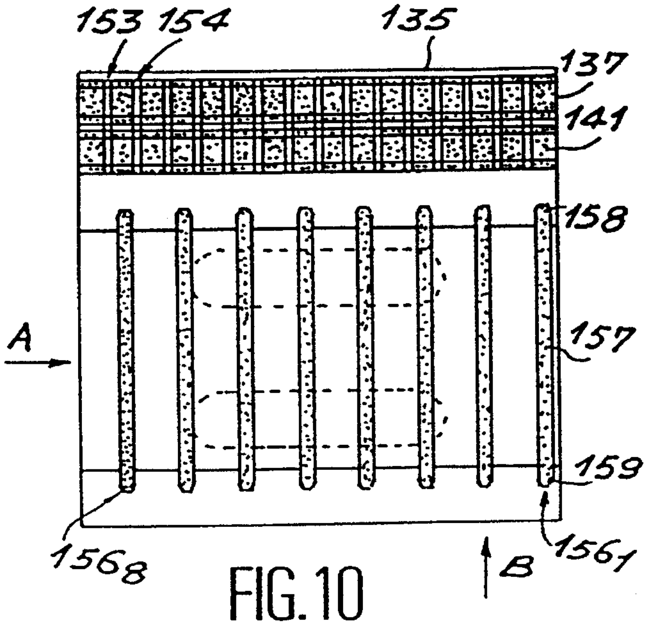

FIGS. **2*a* and 2*b*** are schematic sectional views of a multijet printing module, each along a plane perpendicular to the one containing the ink jets;

FIG. **3*a*** is an isometric projection, partly in exploded form, of a multijet printing module according to the invention;

FIG. **3*b*** is a sectional view, drawn to an enlarged scale, of a device for the collection of the unused drops of an ink jet;

FIG. 4 is a functional diagram of an electronic circuit associated with each multijet printing module;

FIG. **5*a*** is a view showing the positions of different paths of ink drops with respect to the associated deflection electrodes as well as with respect to the gutters for collecting the undeflected drops;

FIG. **5*b*** is an isometric view of the tilt of the gutters for collecting the undeflected drops;

FIGS. **6*a* and 6*b*** are views showing a part of the feeding circuits for the supply containers of nine multijet printing modules of the printing machine according to the invention;

FIGS. **6*c* and 6*d*** are views showing a part of the draining circuit for the supply containers of nine multijet printing modules of the printing machine according to the invention;

FIG. **6*e* is a top view along the arrow E of FIG. 6*d***;

FIG. 7 is a schematic view of the hydraulic circuit for the feeding and draining of the supply containers as well as for the collection of the undeflected drops of the printing machine comprising nine multijet printing modules;

FIG. 8 is an exploded view of a modular, multijet deflection head;

FIG. 9 is an isometric view of the modular, multijet deflection head after the assembling of the elements of FIG. 8;

FIG. 10 is a front view of the modular, multijet deflection head after the assembling of the different elements of FIG. 8;

FIG. 11 is a side view of the modular, multijet deflection head along the arrow A of FIG. 10, and FIG. 12 is a view of the modular, multijet deflection head along the arrow B of FIG. 10.

MORE DETAILED DESCRIPTION

Figure 1:
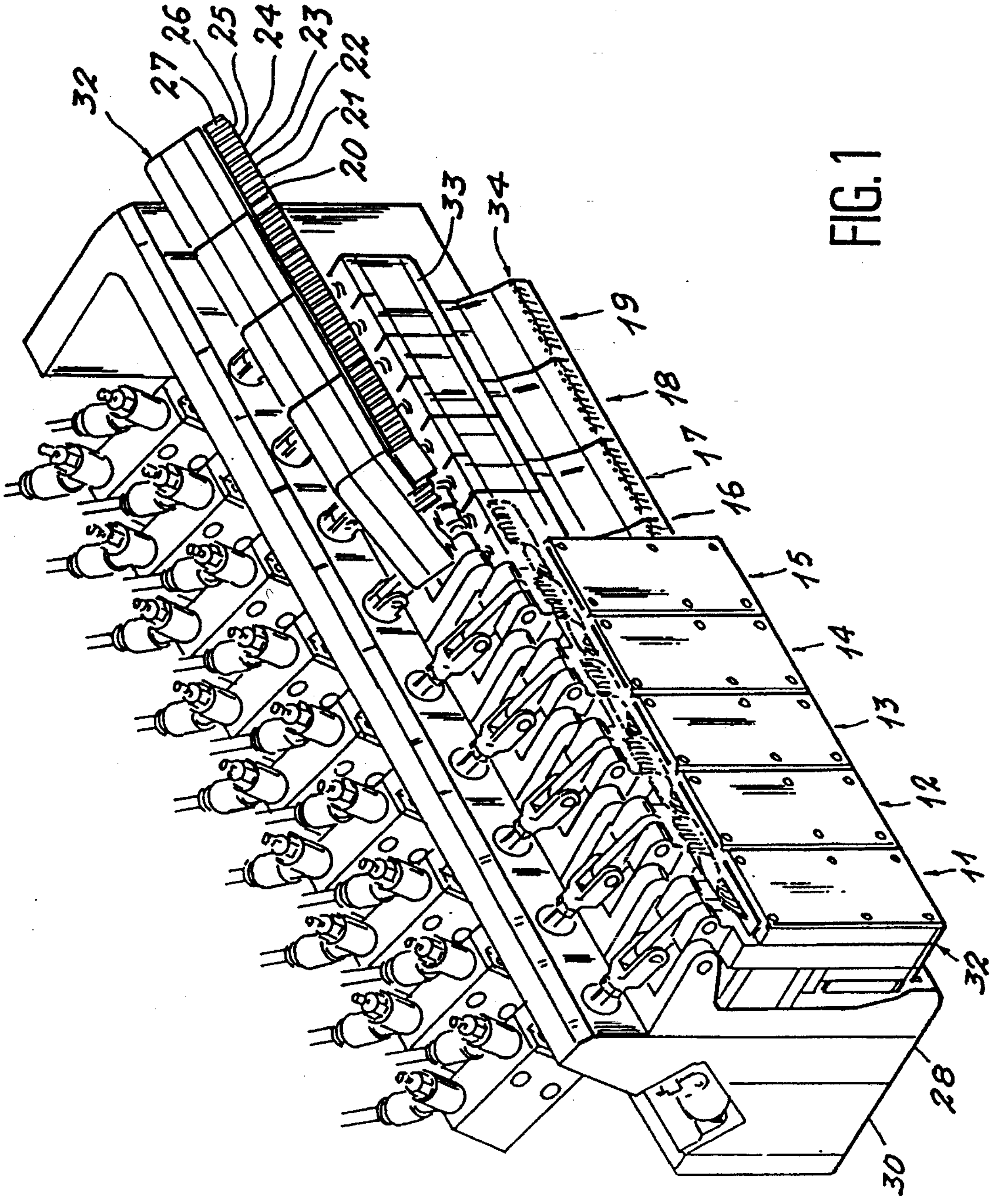
FIG. 1 is an isometric projection of a printing machine comprising a plurality of multijet printing modules, according to the invention.

FIG. 1 is a view showing a wide-format printing machine according to the invention comprising a set of nine printing modules 11 to 19 each having m=8 printing jets 20 to 27, which makes a continuous row of 72 evenly spaced out printing jets. The nine printing modules are mounted so as to be adjacent on a supporting beam 28 common to all the modules. Each printing module comprises (FIG. 2):

- a single-piece element 29 to support a device 33 for the generation of m=8 ink jets and a channel 34 for the recovery or collection of the undeflected drops of each jet; the eight ink jets are evenly spaced out in a plane perpendicular to the plane of FIG. 2, the trace of which is represented by the axis 33';
- a multijet deflection head 32, this multijet deflection head 32 being presented in two positions, one "low" for the working position and one "high" for the maintenance position;
- a part 31 for the rotational actuation of the multijet deflection head 32 about a shaft 49 borne by the single-piece element 29. This actuating part 31 is fixedly joined to the supporting beam 28.

The side of the supporting beam 28 that is opposite the side bearing the single-piece element 29 of each printing module is associated with a single part 30 which, in combination with said beam 28, forms a container 62 for the collection or draining of the ink from the collection gutters of the nine printing modules and, in combination with a plate 110, forms a cavity 111 for the distribution of ink to the nine multijet generation devices 33.

The supporting beam 28 has internal passages that set up the connection between, on the one hand, the collection container 62 and, on the other hand, the gutters 34 and the generation devices 33 of the nine printing modules mounted on the supporting beam 28. It also has other internal passages to set up the connection between the distribution cavity 111 and the generation devices 33. These different elements shall be described in greater detail here below.

Figure 2A:
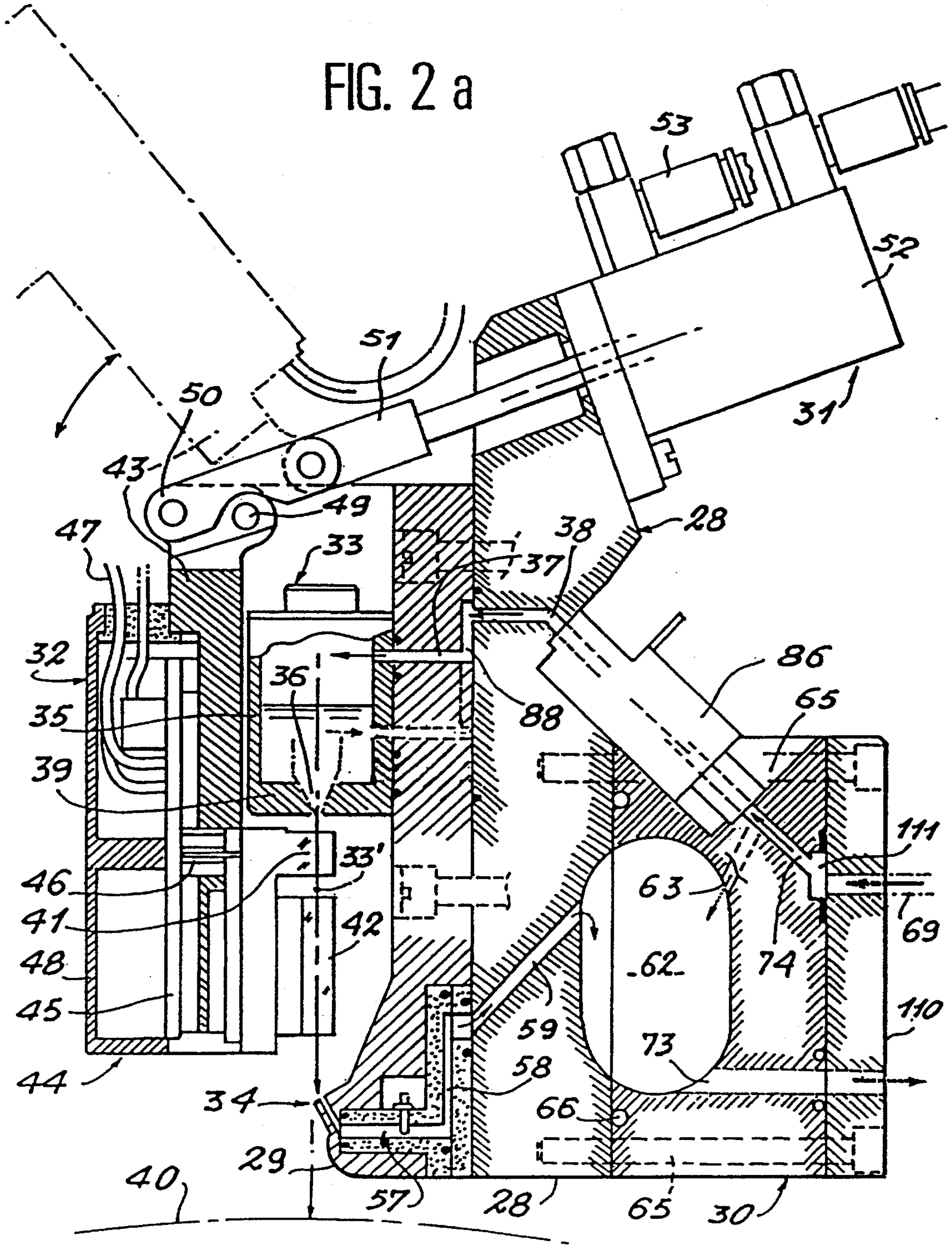
Figure 2B:
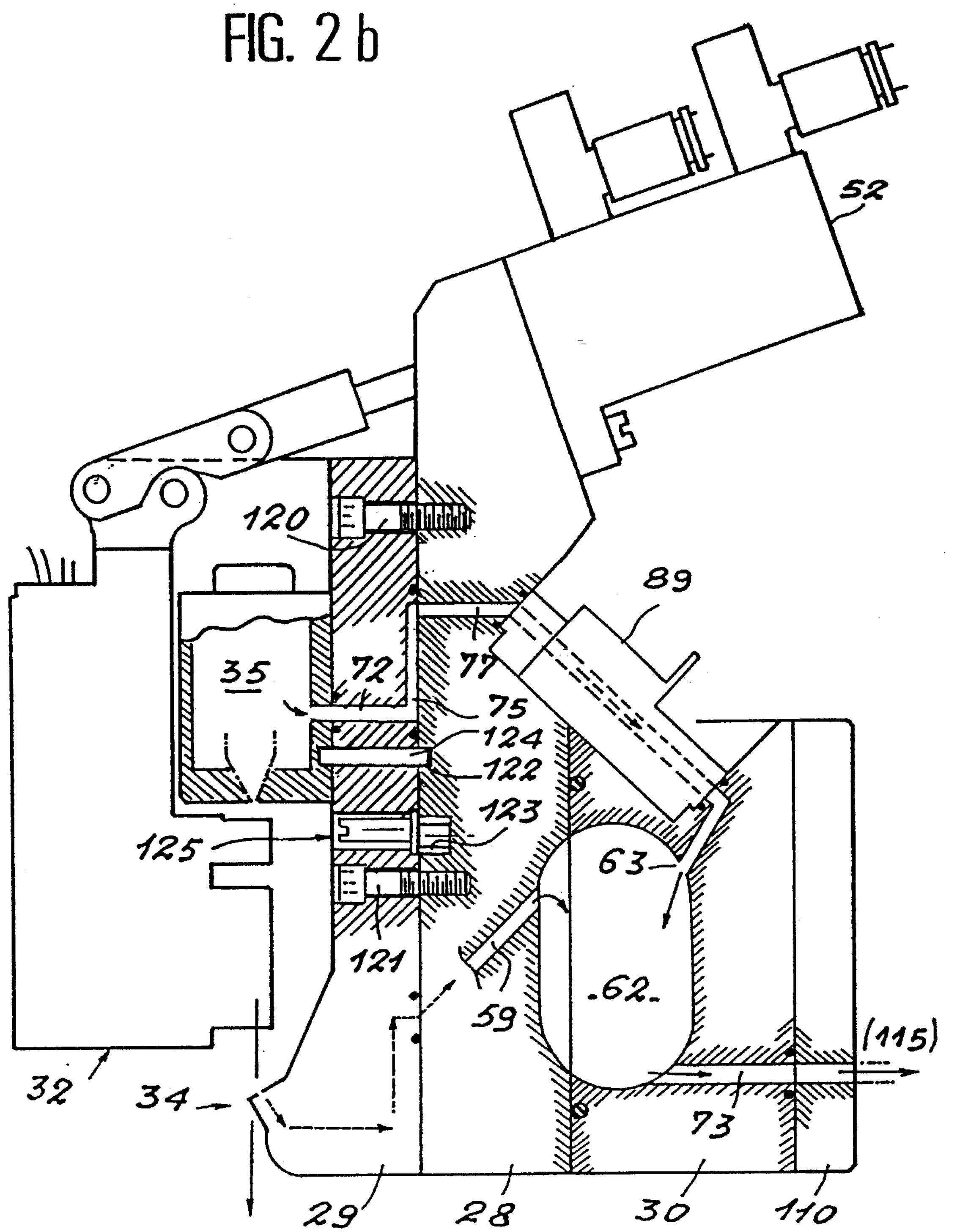

It must be noted that FIGS. 2*a* and 2*b* are essentially schematic sectional views intended to sustain the description and are not real sections of the machine. Thus, the passages shown therein are not always in the plane of the sections but in parallel planes. Thus, FIG. 2*b* corresponds mainly to the plane of the passages for the draining of the container 35 and of the gutters 34 of a printing module, but the passage 73 is not in the same plane (see FIG. 6*c*). Similarly, FIG. 2*a* corresponds mainly to the feeding pipes of the container 35, but the passage 69 is not in the same plane (see FIG. 6*a*), nor is the collection passage 59.

The device 33 for the generation of eight ink jets comprises a stimulation container 35 which is fixed to the single piece part 29 in which there are drilled, on the one hand, a passage 37 for the feeding of ink to the container 35 and, on the other hand, a passage 72 for the draining of this container. The liquid, contained in the container 35, is pulsed or ejected in the form of jets towards the exterior of said container towards the gutter 34 through micro-openings 36 drilled in a nozzle plate 39 fixedly joined to the lower part of the container 35. Such ejection heads as well as the nozzle plate are described, for example, in the U.S. Pat. No. 4,714,932. At the outlet of the nozzles, each jet of liquid breaks into microdrops and goes through the multijet deflection head 32 where certain drops are electrically charged by charge electrodes 41, then deflected from their initial path towards the gutter 34 by deflection electrodes 42 to make an impact outside this gutter on a medium 40 to be printed on, which moves in front of the printing module.

Such a multijet deflection head 32, designed to deflect m=8 ink jets, is described for example in the U.S. Pat. No. 5,394,180 and is incorporated by reference. Such a multijet deflection head comprises (FIGS. 8 to 12) a stack of eleven elements 135 to 145 in the direction of movement of the undeflected ink jets, some elements referenced 137, 141, 143, 144 and 145, each constituting one electrode, while the other elements 135, 136, 138, 139, 140 and 142 constitute partition walls with particular functions. Each of these eleven elements has two holes such as those referenced 150 and 151 on the element 135 to be used for alignment during the assembling of said elements.

In the direction of the movement of the ink jet, the first element 135 is a shim made of insulating material that acts as a reference for the stacking of the other elements and for their positioning with respect to the device which gives the ink jets.

The second element 136 is a first shielding plate made of an insulating material, and its face on the shim 35 side is metallized except around the alignment holes.

The third element 137 is a supporting plate for m=8 charge electrodes such as the one referenced 146 and their supply conductors such as the one referenced 147. These conductors are extended on the rear edge of the plate so that they can be connected to flexible conductors.

The fourth element 138 is a second shielding plate made of an insulating material, with its face on the side opposite that of the charge electrodes plate 137 being metallized except around the alignment holes.

The fifth element 139 is an electrical insulation spacer formed by a plate of insulating material.

The sixth element 140 is a third shielding plate made of an insulating material, and its face on the shim 135 side is metallized except around the alignment holes.

The seventh element 141 is a supporting plate for m=8 detection electrodes such as the one referenced 148 and their connecting conductors such as the one referenced 149. These conductors are extended on the rear edge of the plate so that they can be connected to flexible leads.

The eighth element 142 is a fourth shielding plate made of an insulating material, with its face on the side opposite that of the detection electrodes plate 141 being metallized except around the alignment holes.

The elements 136 to 142 have slots drilled in them, parallel to the path of the undeflected ink jets. Some of these slots, referenced 153, have a depth sufficient to go partially through the electrodes 146 and 148 and thus to enable the passage of the ink jets and the others, referenced 154, have a greater depth than the preceding ones to demarcate spaces of equal width between the inserts and reduce interference among the jets.

The slots 153 corresponding to the electrodes are not metallized except at the position of the electrodes while the slots 154 are metallized throughout their depth.

The ninth, tenth and eleventh elements (143, 144 and 145) together constitute the electrodes for the deflection of the drops of the ink jets and are each made of blocks of insulating material in which deep grooves are used to separate partitions, the walls of which are metallized. The metallized walls of the tenth element 144 are connected to supply conductors such as those referenced 152.

The insulating material of the different elements is for example ceramic, the characteristics of which enable it to be machined, notably in thickness, with a precision of the order of a few microns.

The four shielding plates 136, 138, 140 and 142 each have a thickness of 0.5 millimeter for example, and the metal layer is made of a noble material, for example a gold alloy, that provides for the prevention of electro-erosion and has a thicknesss of about 2 to 10 microns, preferably 2 to 4 microns.

The spacer 139 has a thickness of about one millimeter. In the element 137, the charge electrodes are made, for example, of metal inserts that are bonded inside holes drilled in the supporting plate having a thickness of two millimeters for example. The supply conductors are formed by metal tracks having a thickness of about four microns. These metal tracks are connected to the inserts.

In the element 141, the detection electrodes are also formed by metal inserts that are bonded inside holes drilled in the supporting plate, having a thickness of two millimeters for example. The linking conductors are formed by metal tracks having a thickness of about four microns. These metal tracks are connected to the inserts. The rest of the supporting plate on the metal conductors side is metallized except on zones on each side of the inserts and of the metal tracks. The thickness of the metallization is about 4 to 15 microns.

The metal inserts should be made of a material that should have the following characteristics: an expansion coefficient close to that of the supporting plate, ease of metallization for the connections with the supply conductors and ease of machining for the drilling of the slots. This material is obtained, for example, by the sintering of at least one metallic powder.

As indicated hereabove, the deflection electrodes are constituted by three elements 143, 144 and 145 which, unlike the other elements 135 to 142, are not insulating plates but insulating blocks. One of these blocks is a central block 144, the metallized walls of which receive the high voltage of deflection through conductors such as those referenced 152, and two other blocks, 143 and 145, are positioned respectively upstream and downstream with respect to the direction of the ink jet. These electrodes constituted by the metallized walls of the blocks 143 and 145 are used to reduce the risks of breakdown.

Half of the supply conductors 152 are made on the input face of the block 140 and the other half on the output face of the block, this being done so that two successive electrodes are supplied as follows: one by a conductor on the input face and the other by a conductor on the output face.

The multijet deflection head 32 is mounted on a side of a rotating arm 32, the other side of which supports an electronic pack 44. This electronic pack, which is of the shielded type, comprises a printed circuit 45 on which there are mounted different electronic components performing various electronic functions which shall be described in fuller detail in relation with FIG. 4.

This printed circuit 45 is connected to the electrodes of the multijet deflection module 32 by one or more flexible cords or connectors 46 and to an electronic control device (not shown) by one or more flexible cables 47. The pack 44 is closed by a metal lid 48.

As described in relation with FIGS. 1 and 2, the arm 43 pivots on the shaft 49 which is fixedly joined to the upper part of the single-piece element 29 by the combination of a connecting rod 50 and a strap 51 that is driven in translation by a jack 52 provided with one-directional flow-rate limiters 53. This rotation makes it possible to lower the arm 43 so that the ink jet or ink jets can go through the multijet deflection head and lift it to enable access to the nozzle plate 39 and to the multijet deflection head for their maintenance.

Figure 3A:
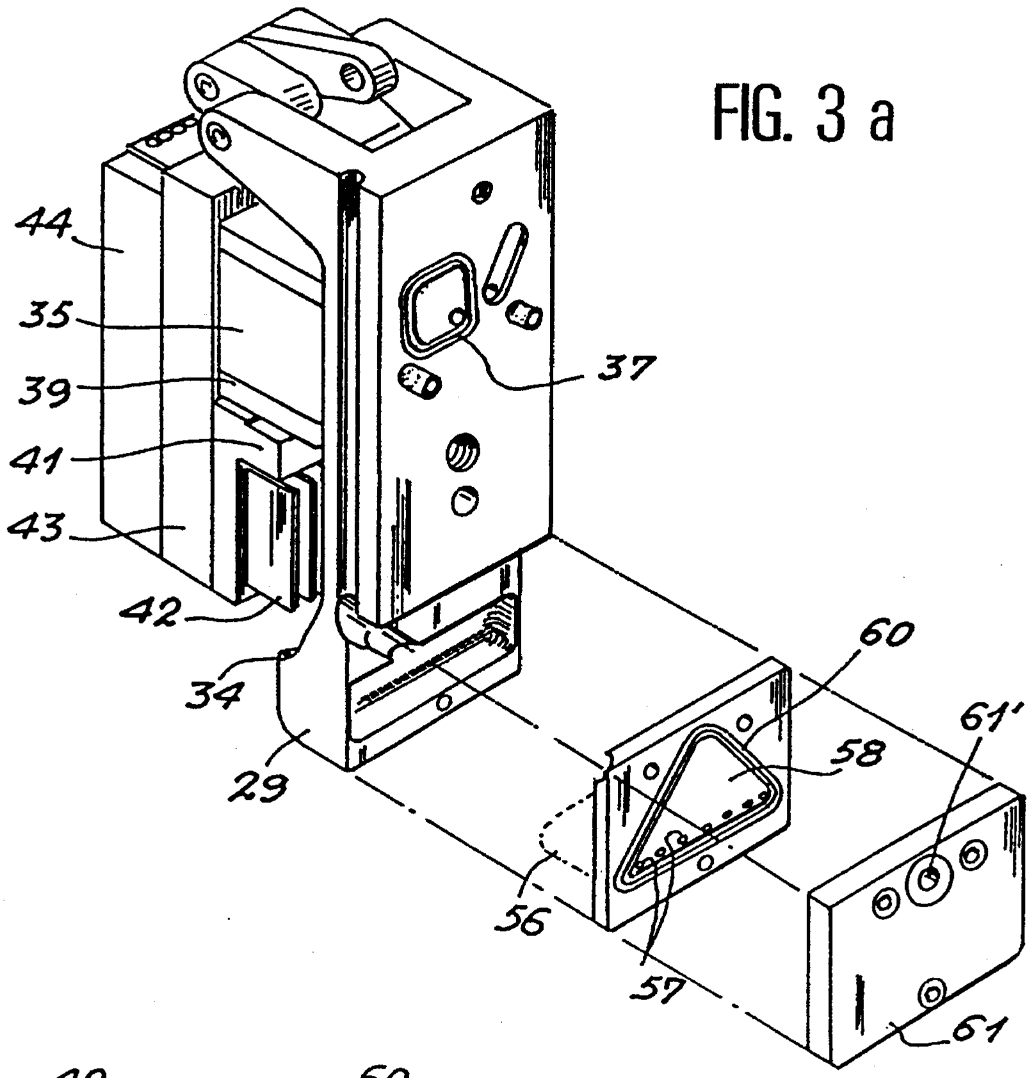
Figure 3B:
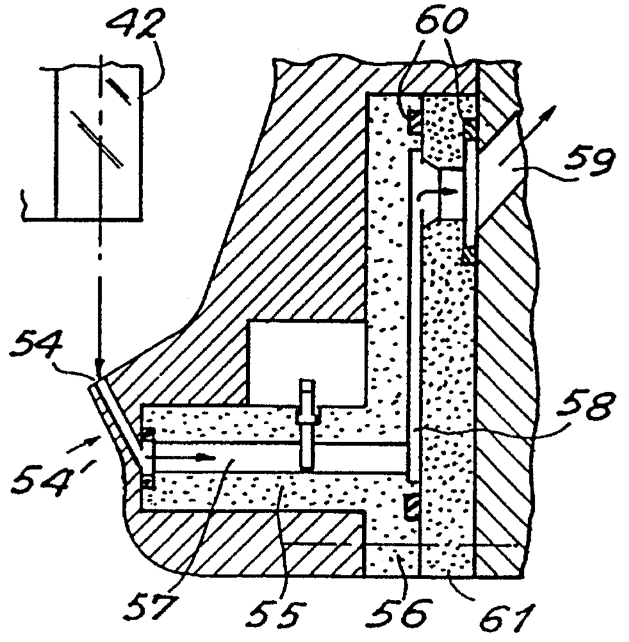

The gutter 34 for the collection of the unused ink drops of a jet, namely its undeflected drops, is positioned in the lower part of the single-piece element 29 (FIGS. 2 and 3). It comprises, for each ink jet, an inlet aperture 54 drilled in the forward part 54' of the single-piece element 29 and a cavity 55 in which there is positioned a block 56 made of insulating material that is crossed by eight passages or holes 57 communicating, on one side, with the inlet apertures 54 and, on the other side, with the container 62 by a cavity 58 and a passage 59.

The eight passages 57 therefore open out into this cavity 58 (FIG. 3) in the form of a triangle so that the liquid from the unused drops is sucked up by the pipe 59, the inlet aperture of which is positioned in the upper part of the cavity 58, namely at the vertex of the triangle.

The cavity 58 is closed by a plate 61 which has an opening 61' constituting the inlet of the pipe 59. Seals 60 are provided to set up impervious sealing between the block 56 and the plate 61 and between this plate 61 and the pipe 59 which is drilled in the beam 28.

The container 62 is obtained by a first cavity positioned in the beam 28 and by a second cavity positioned in the part 30, part 30 being joined to the beam 28 by bolts 65 and seals 66, these bolts 65 being used also to assemble the rear plate 110.

The container 62, called a collection or draining container, is connected to a solenoid valve 89, also called a draining solenoid valve, by a passage 63, said solenoid valve being furthermore connected to the container 35 by a passage which goes through the beam 28 and the single-piece element 29. The passage has three parts, a first horizontal part 77 designed for the crossing of the beam 28, a second part 75 in the form of a cavity in the single-piece element 29 and a third part 72 for the crossing of the single-piece element 29.

Figure 6C:
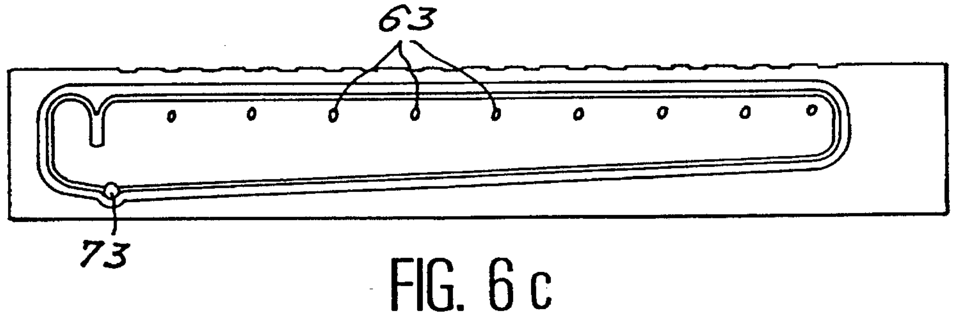

The container 62 is common to all the printing modules mounted on the beam 28, i.e. to the nine modules shown in FIG. 1. FIGS. 6*c* and 6*d* (FIG. 6*c* being a view along the arrow C of FIG. 6*d*) show the container 62 in the part 30 as well as the nine openings 63' of the passages 63 which open therein from the solenoid valve 89.

The bottom of the container 62 is inclined so as to enable the recovery of the liquid through a passage 73, the aperture of which is located at the lowest point.

To check the efficient operation of the collection of the unused drops, each passage 57 is fitted out with a contact 85 which, with reference to the potential of the single-piece element 29, enables the detection of the presence of liquid in the gutter. It is for this reason that the parts 56 and 61 are made of an insulating material.

A liquid detector may be formed, on a non-exhaustive basis, according to the exemplary embodiment described in the U.S. Pat. No. 4,568,947.

The distribution of the liquid to all the containers of the nine modules is done by the distributor 111 that is made on the rear face of the part 30 and communicates with a solenoid valve 86, called a feeding valve (one per module) by passages 74 which end in apertures 74', of which there are nine, in the distributor 111. This distributor 111 is fed with ink by a passage 69, the input aperture of this passage 69 in the distributor being referenced 69'. In the distributor, the passages 74 are fed with a main passage 76 connected to the feeding passage 69 and secondary passages 87 which are designed to balance the regular and singular charge losses towards each container 35. These different main passages 76 and secondary passages 87 are closed by a plate 110 which gets applied against the rear face of the part 30.

To feed the container 35, the solenoid valve 86 communicates with this container 35 by a passage 38 inside the beam 28, a passage 37 inside the single-piece element 29 and a cavity 88 in the single-piece element 29 connecting the two passages 37 and 38.

Figure 6E:
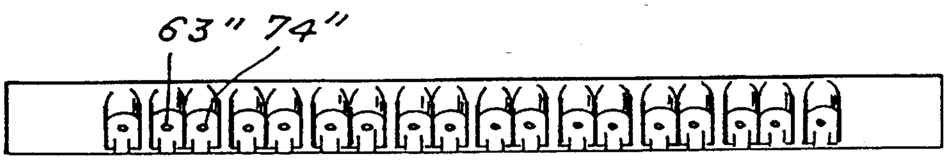

FIG. 6*e* shows the apertures 63" and 74" of the passages 63 and 74 at the position of their connection with the corresponding solenoid valves 89 and 86.

Figure 5B:
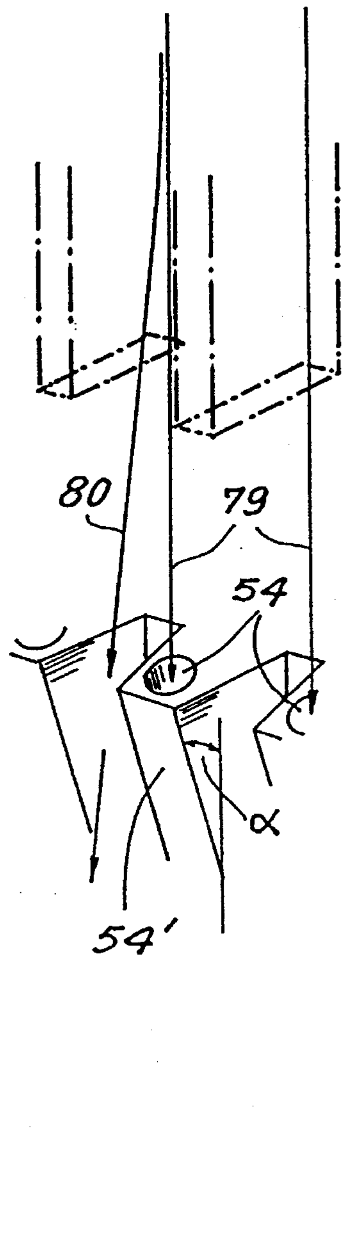
Figure 5A:
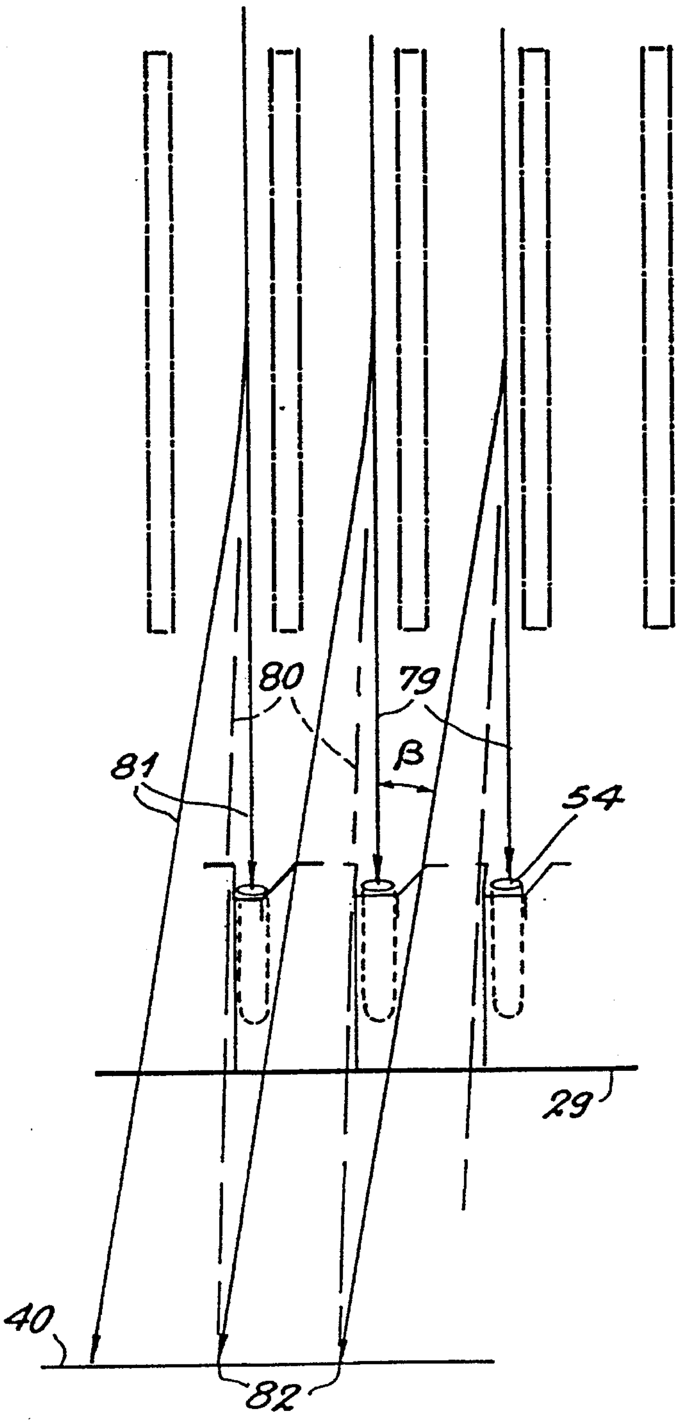

FIGS. 5*a* and 5*b* show the special shape and position of the gutters 34 which are cut into the element 29 in such a way that there is an overlapping of the tracks of the adjacent jets. This shape is such that:

- the undeflected drop falls into the gutter along the path 79,
- the least deflected drop passes at the closest distance from the gutter along the path 80, and
- the most deflected drop passes at the closest distance from the adjacent gutter without striking it and, on the medium 40, reaches the point of impact 82 of the least deflected drop of the adjacent track along the path 80.

To this effect, the gutter 54' should be inclined by an angle α with respect to the first vertical plane containing the jets and by an angle β with respect to a second vertical plane perpendicular to the first one.

FIG. 4 is a functional diagram that shows the different functions fulfilled by the electronic circuits laid out in the card 45.

The first function is to transfer the signals between the multijet deflection jet and an external control device 90.

The second function is to record information elements that characterize the modifications to be performed automatically on control signals to take account of certain defects.

The transfer function relates to the charge voltages of the drops that are transmitted to the charge electrodes by the conductors 95 coming from the control device 90 (circuit 99), the deflection voltage that is transmitted to the deflection electrodes by conductors 92 coming from the control device 90 (supply circuit 93), the phase detection signals which are transmitted from the phase detection electrodes towards the control device 90 (processing circuit 99) by conductors 94, a multiplexing circuit 101, a preamplifier 100 and a conductor 102. The multiplexing circuit is controlled by signals on conductors 103, prepared by the processing circuit 99.

The function of the recording of the characteristic information elements of the multijet printing module is fulfilled by a memory 105 of the permanent type that is recorded during the tuning and adjustment operations in the factory. These information elements relate, for example, to the static errors of the multijet printing head, such as the misalignment of the jets and, in this case, the processing circuit 99 carries out an overall correction of the charge of the drops and triggers, ahead of time or with a delay, the emission of the charged drops to obtain a better positioning of the impacts on the medium 40. To this end, it uses the information elements given by the memory 105.

The information elements contained in the memory 105 may also relate to elements other than the multijet deflection head and, notably, the characteristics of the device used to obtain jets of liquid associated with the container 35 as well as data elements that make it possible to follow the progress of the module when it is being manufactured and during maintenance.

The functional hydraulic diagram of FIG. 7 enables an understanding of how the different passages, pipes, containers and solenoid valves described hereabove are interconnected so as to fulfil the different functions of a printing machine comprising nine elementary modules having eight jets each. This diagram also indicates the elements to be added to enable the desired operation of the machine.

In this diagram, the references identical to those mentioned in relation to the description of the other figures designate the same elements. It is thus that the distributor 111 feeds the nine containers 35 of the nine elementary modules 11 to 19 (FIG. 1) by passages 74, solenoid valves 86, passages 38, 88 and 37. The undeflected drops 79 of the ink jets are recovered by gutters 34 where they are sucked into the container 62 by passages 57, 58 and 59. The containers 35 are drained through passages 72, 75 and 77 (not shown in FIG. 7), solenoid valves and passages 63 which end at the collection container 62.

The distributor 111 is fed by a pump 112 which is connected, on one side, to said distributor by the passage 69 and, on the other side, to a general container 117 by a passage 118.

The container 62 is drained by a pump 115 which is connected, on one side, to said container 62 by the passage 73 and, on the other side, to the general container 117 by a passage 116.

A depression is set up in the collection container 62 by a pump 113 which is connected to said container 62 by a passage 114.

As can be seen in FIG. 2*b*, each single-piece element 29 is fixed to the beam 28 by at least two screws 120 and 121. The precise position of each module on the beam is obtained by a horizontal groove 122 of the beam 28 which cooperates with two horizontal studs 124. The studs 124 are rods that go right through the single-piece element 29 and thus enable the positioning, simultaneously, of the stimulation element 35 on the single-piece element 29 and of the element 29 on the beam 28. There is provision also for an oblong shaped vertical groove 123 which cooperates with an eccentric element 125 so as to laterally adjust the position of the single-piece element 29 on the beam 28.

What is claimed is:

1. A multijet printing module with m parallel ink jets comprising:

- first means for generating m parallel ink jets arranged in a plane,
- second means for deflecting at least certain drops of ink coming from said ink jets towards a medium to be printed on,
- third means for collecting the undeflected drops,
- fourth means for feeding said first means with ink,
- fifth means for transferring the ink recovered by the third means to a draining container,
- sixth means for draining said first means in said draining container,
- said first, second and third means are borne by an element consisting of a single-piece element, the second means being mounted in a pivoting manner on said single-piece element so that said second means can be interposed between said first and third means during the printing on said medium to be printed on and can get withdrawn therefrom to enable maintenance of said fourth, fifth and sixth means,
- said single-piece element is borne by one face of a supporting beam,
- said fourth, fifth and sixth means are borne by the other face of said supporting beam.

2. A multijet printing module according to claim 1, wherein said first means communicate with the fourth and sixth means by passages located inside said single-piece element and said supporting beam.

3. A multijet printing module according to claim 1, wherein said third means communicate with said fifth means by passages located inside said single-piece element and said supporting beam.

4. A modular multijet printing module according to claim 1, wherein said draining container comprises an internal cavity formed in said supporting beam.

5. A multijet printing module according to one of the claims 1 to 4, wherein said sixth means for draining said first means include a solenoid valve that communicates, on a first side, with said first means by passages located in the supporting beam and the single-piece element and, on the other side, with the draining container by a passage located inside a single part.

6. A multijet printing module according to one of the above claims 1 to 4, wherein said fourth means comprise a solenoid valve that communicates, on a first side, with said first means by passages located inside said supporting beam and the single-piece element and, on the other side, with a feeding container by a pipe connected to a distribution circuit.

7. A multijet printing module according to one of the above claims 1 to 4, wherein said fifth means for transferring the ink collected by said third means comprise a passage located inside said supporting beam and a device that creates a depression inside said draining container.

8. A multijet printing module according to claim 6, wherein said draining container communicates with said feeding container by passages and a pump.

9. A multijet printing module according to one of the above claims 1 to 4, wherein said third means for collecting the undeflected drops are made in the single-piece element and comprise as many inlet pipes as ink jets, said inlet pipes being connected to a collection cavity located on a side of said single-piece element by passages going through said single-piece element.

10. A multijet printing module according to claim 9, wherein said pipes and passages going through said single piece element and said collector cavity are made in a block of insulating material.

11. A multijet printing module according to claim 10, wherein each of said pipes and passages going through said single piece element comprises a liquid detection electrode located in the insulator block.

12. A multijet printing module according to one of the above claims 1 to 4, wherein said single-piece element is fixed to said supporting beam by means of screws and wherein its position is adjusted horizontally by an eccentric element cooperating with a vertical oblong groove and by studs borne by said single-piece element cooperating with a horizontal groove of the supporting beam.

13. A multijet printing module according to one of the above claims 1 to 4, wherein the pivoting of said second means for deflecting the jets is obtained by an arm for supporting said second means, said arm pivoting about a shaft fixedly joined to said single-piece element, through a connection rod and a strap that is driven in translation by the supporting beam.

14. A multijet printing module according to one of the above claims 1 to 4, wherein said second means for deflecting the ink jets include an electronic device which applies charge voltages to charge electrodes and detects charge signals of said drops of ink.

15. A multijet printing module according to claim 14, wherein said electronic device further comprises a memory that contains information elements which are characteristic of the operation of said second means and are used to modify said charge voltages as well as the triggering instants of emission of said drops of ink.

16. A printing machine comprising a plurality of multijet printing modules with m parallel ink jets, each module comprising:

first means for generating m parallel ink jets arranged in a plane, second means for deflecting at least certain drops of ink coming from said ink jets towards a medium to be printed on, third means for collecting the undeflected drops, fourth means for feeding said first means with ink, fifth means for transferring the ink recovered by the third means to a draining container, sixth means for draining said first means in said draining container, wherein:

said first, second and third means are borne by an element consisting of a single-piece element, the second means being mounted in a pivoting manner on said single-piece element so that said second means can be interposed between said first and third means during the printing on said medium to be printed on and can get withdrawn therefrom to enable maintenance of said fourth, fifth and sixth means, said single-piece element is borne by one face of a supporting beam, said fourth, fifth and sixth means are borne by the other face of said supporting beam, said fourth means including a solenoid valve that communicates, on a first side, with said first means by passages located inside said supporting beam and the single-piece element and on the other side, with a feeding container by a pipe connected to a distribution circuit, wherein said modules are juxtaposed so as to keep a constant pitch between all the jets on the entire printing machine on said supporting beam and communicating with said draining container and the distribution circuit which are common to all the modules.

* * * * *